No. 608,104. Patented July 26, 1898.
J. P. BUCKLEY.
ELECTRIC SOUNDING DEVICE FOR SHIPS.
(Application filed Dec. 11, 1897.)
(No Model.)
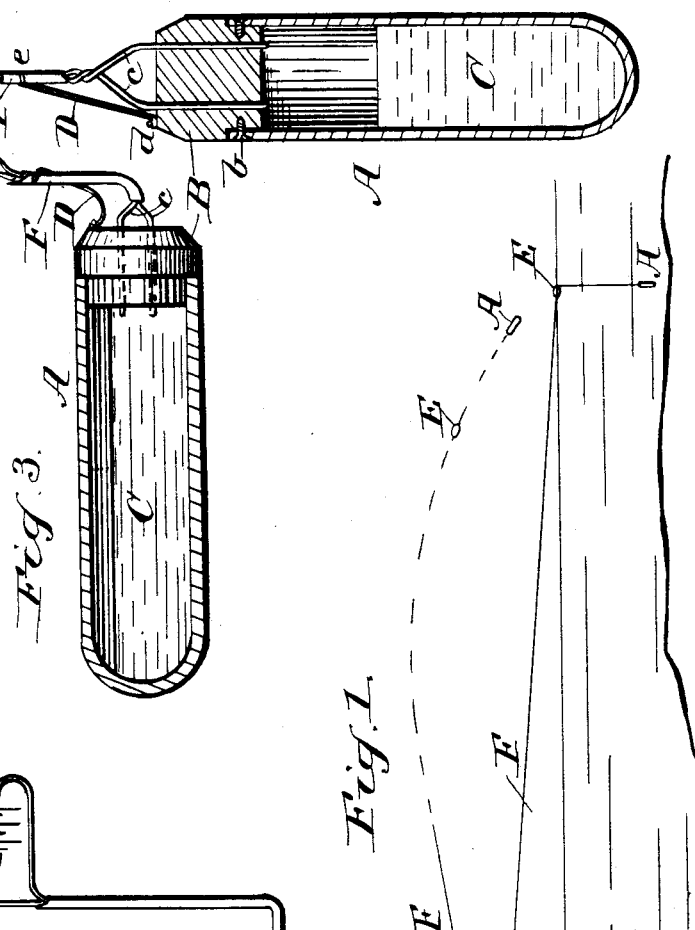
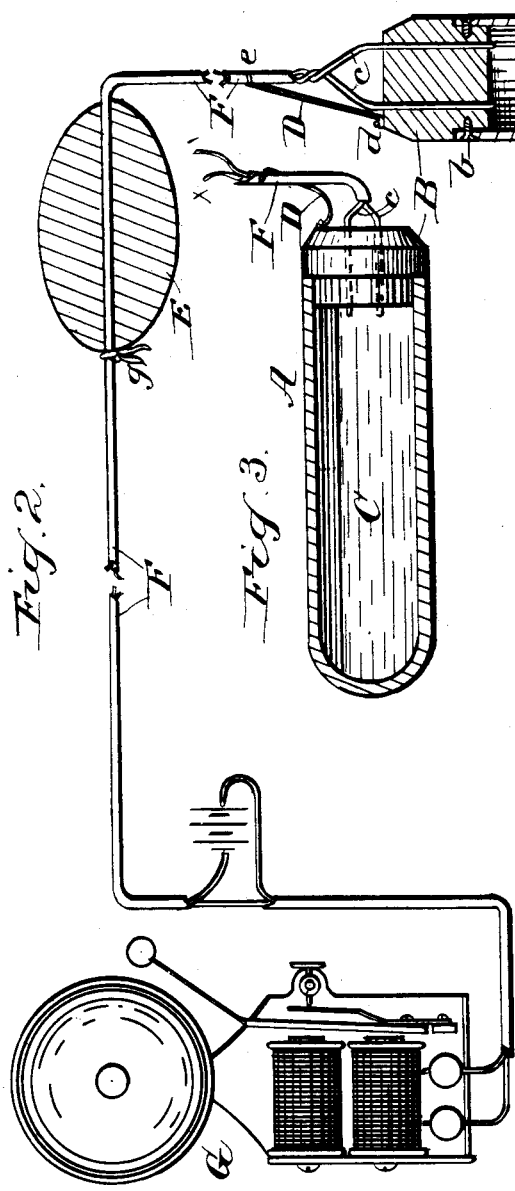
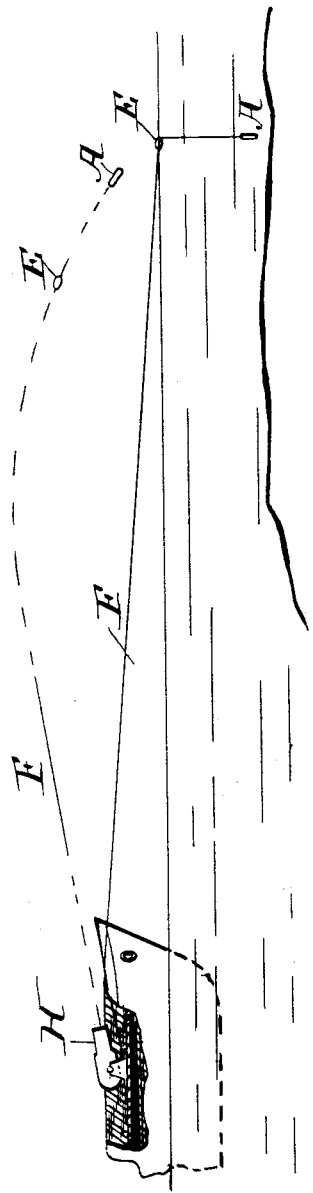
Witnesses.
E. E. Clark
H. M. Gillman
Inventor.
John P. Buckley
By C. F. Belt
Attorney.
THE NORRIS PETERS CO., PHOTO-LITHO., WASHINGTON, D. C.

UNITED STATES PATENT OFFICE.

JOHN P. BUCKLEY, OF NEW ORLEANS, LOUISIANA.

ELECTRIC SOUNDING DEVICE FOR SHIPS.

SPECIFICATION forming part of Letters Patent No. 608,104, dated July 26, 1898.

Application filed December 11, 1897. Serial No. 661,469. (No model.)

*To all whom it may concern:*

Be it known that I, JOHN P. BUCKLEY, a citizen of the United States, residing at New Orleans, in the parish of Orleans and State of Louisiana, have invented certain new and useful Improvements in Electric Sounding Devices for Ships, of which the following is a specification.

This invention relates to a long-distance sounding apparatus for ships or other vessels, and particularly to an electrical sounding device to ascertain the depth of the water far in advance of the vessel and operate an alarm on board the same.

The prime object of the invention is to provide means whereby the depth of the water may be determined considerably ahead or in advance of the ship or other vessel under navigation without stopping or retarding the speed of the ship, thus avoiding all danger and risk of running into hidden shoals or other obstructions.

A further object of the invention is to provide a channel or course sounder for nautical vessels adapted to be discharged from a vessel in advance thereof to determine the safe course of said vessel.

A further object of the invention is to provide a sounding device to be discharged from a vessel while in motion, to locate a shoal or shallow water, and to give an alarm on board said vessel simultaneously with such location.

A still further object of the invention is to provide an electric sounding device adapted to be vertically suspended in the water or course of a vessel by a suitable float in advance of the vessel to indicate that the water for the vessel's course is of sufficient depth, said device adapted to come in contact with any obstacle or obstruction that would lessen said depth and by such contact to assume substantially a horizontal position, establishing a continuous current from the sounder to a bell on the vessel, which gives an alarm simultaneously with said interference upsetting the sounder.

The invention consists in discharging an electric sounder in advance of a vessel to give an alarm or warning on board said vessel of an obstruction or shallow water.

In the accompanying drawings, forming part of this application, Figure 1 is an elevation of the front portion of a vessel, showing the sounder in dotted lines, being discharged and floating in full lines. Fig. 2 is an enlarged sectional view of the sounder and float in position to indicate a clear course for a vessel, showing the bell and electrical connections from the sounder to the bell in elevation and partly broken away. Fig. 3 is a detached sectional view of the sounder in position to establish the electric current through the bell and give an alarm of approaching shallow water.

The same letters of reference denote the same parts throughout the several figures of the drawings.

The cylindrical shell or casing A has a stopper B to confine in the shell the mercury C, though any other suitable liquid contact-maker may be employed to the same end. This shell, the stopper, and the mercury constitute the sounder. The stopper B is of a non-conducting material and is tightly secured to the mouth of the shell by set-screws $b\ b'$, through which stopper the contact-wires $c\ c'$ run parallel and terminate on the inner side for the purpose of engaging the mercury C when the sounder is resting in a horizontal position.

D is a chord, preferably of a flexible order, one end of which is fixed to the shell at point $d$, while the other is tightly fixed along the circuit-line F at point $e$. Before securing these ends, however, I cause a slack of the circuit-lines to be taken in between the said ends, so that the line D may receive any shock that may happen in the throw, which is for the purpose of protecting the terminals $c\ c'$.

The float E is of a light substance, preferably of cork, through which the bell-circuit E passes and is held thereto by means of the string $g$ and is for the purpose of carrying the shell perpendicularly when the depth is greater than that which has been allotted between the said shell and float.

The distance or the depth between the shell and float may be lessened or shortened by drawing the float back or forward and afterward secured by the bowstring $g$. In this way the shell is carried over certain depths, which may or may not afford it rest, as the case might be.

The bell-circuit F is composed of the usual insulated wire, which may be made waterproof by chemical treatment or by being passed through a rubber tubing, and is connected in the usual manner to a switch and battery and thence to an alarm-bell G, which is placed in the pilot-house or in some suitable place within hearing of the operator aboard the vessel.

H is a small-sized mortar or gun, by which means the shell or sounder is discharged or projected and may be of any design or pattern.

In practice the line F is coiled or placed in a "faking" box, after which the float E is drawn to the desired depth or distance from the shell and tied by the string $g$. The shell is now ready to be placed in the gun and is afterward fired by the usual methods. This action projects the shell A to a distance corresponding to the charge of powder or air, which may range from one foot to two thousand feet from the vessel. If the depth of the water be greater than the operator thinks or supposes, the shell will sink to the full depth of the line intervening between the said shell and float, and thus allow the circuit to remain open, which will assure the operator of the safety of his vessel in venturing over the ground. In order to ascertain the depth from the farthest throw of the sounder to the side of the vessel, the line is drawn in and allowed to rest while in progress a second or two, which will result either in continuous silence or in a perceptible alarm, as the case might happen. In the event of a shell encountering a rock or shoal the said shell will topple over on its side, and thus cause the mercury C to fill up the intervening space between the terminals $a\ a'$, which will complete the circuit and cause bell G to give out an alarm, thus notifying the operator that the prescribed depth has been found and granting him ample time in which to change his course.

In order to facilitate investigations, I employ two lines with their proper connections, as herein described, and fire the second one when the first one has been drawn in about half the distance, which after the first throw will enable the vessel to keep up uniform speed while sounding.

I do not confine this apparatus to sounding the sea only, as it may be employed to an equal advantage in steam-boilers or in any place in which a float will act in conjunction with a shell, as described.

Having thus described my invention, what I claim as new, and desire to secure by Letters Patent, is—

1. The combination with a suitable float, and an alarm device, of a shell or casing containing a liquid contact-maker, electric wires attached to the float, the casing, and the alarm device, to suspend the casing without giving an alarm, and to give an alarm when the casing is not suspended, or partially so, as set forth.

2. The combination with the sounder adapted to be projected in advance of a ship, and an alarm device on the ship, of the electric wires connecting the sounder with the alarm device, and a float adjustable on said wires, as set forth.

In witness whereof I hereunto set my hand in the presence of two witnesses.

JOHN P. BUCKLEY.

Witnesses:
CHARLES E. RIORDON,
W. A. CROFFUT.